Dec. 28, 1948.  V. P. DONNER  2,457,648
PIPE COUPLING
Filed May 4, 1946
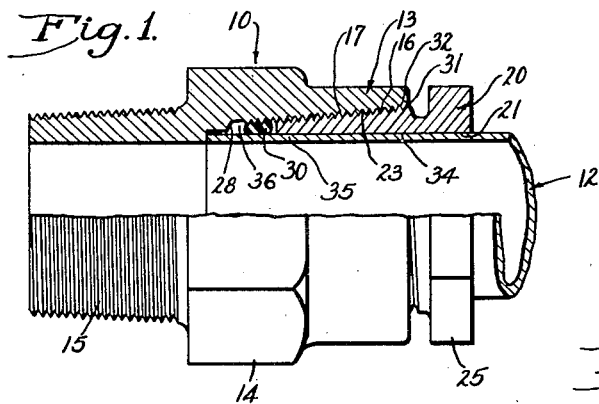
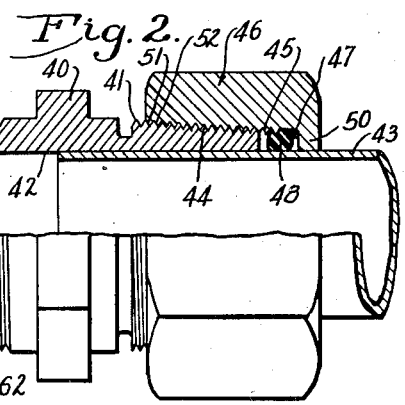
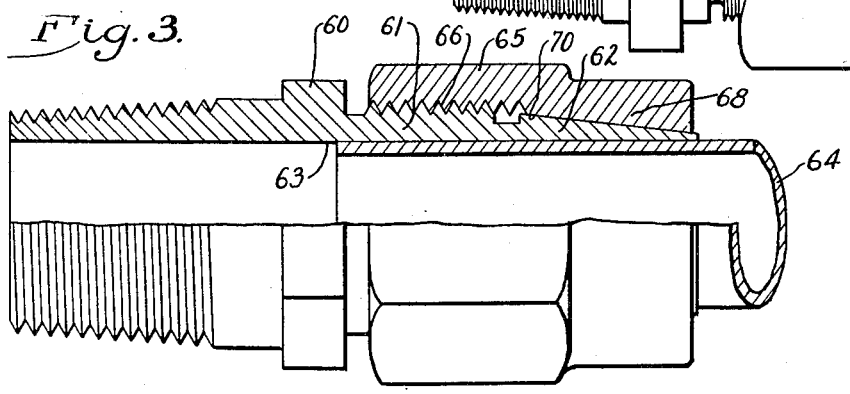
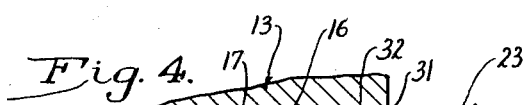
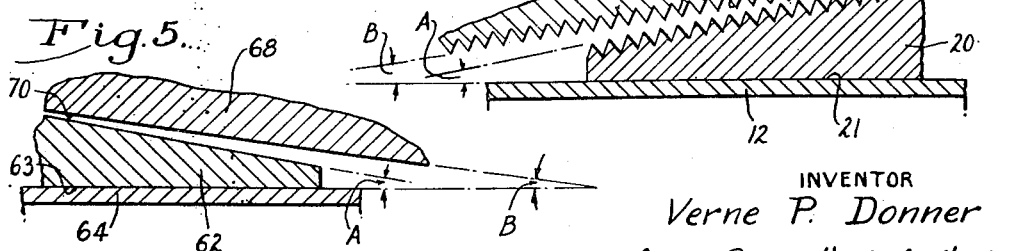
INVENTOR
Verne P. Donner
BY *Carlson Pitzner Hubbard & Wolfe*
ATTORNEYS Patented Dec. 28, 1948

2,457,648

UNITED STATES PATENT OFFICE 2,457,648

PIPE COUPLING

Verne P. Donner, Palatine, Ill., assignor to Mid-Continent Metal Products Co., Chicago, Ill., a corporation of Illinois Application May 4, 1946, Serial No. 667,238

6 Claims. (Cl. 285—123)

The present invention relates to couplings for conduits or pipes and more particularly to couplings for conduits carrying fluid under high pressure. The invention has for its primary object the production of particularly simple and efficient pressuretight couplings for unthreaded conduits.

Another object of the present invention is to provide pressuretight couplings, particularly well adapted for use with thin walled conduits, in which localized stresses and deformation in the walls thereof are minimized and in which the same section of conduit can be repeatedly coupled and uncoupled without substantially affecting the effectiveness of the joint.

A correlative object is to provide pressuretight couplings of increased reliability and freedom from maintenance even under conditions of severe and continued vibration.

It is a further object of the invention to provide couplings for high pressure lines where the latter are constructed of material which cannot be cold worked for the formation of flares, beads and the like or brazed as required for more conventional types of couplings, sealing in the present instance being accomplished by an improved coupling which utilizes extensive surface area of the conduit.

It is still another object of the invention to produce couplings of minimum weight and which allow the use of extremely light weight tubing without sacrificing the effectiveness of the seal.

It is still a further object of the invention to provide couplings which are well adapted for use with negative pressure lines as well as with positive pressure lines.

It is yet another object of the invention to produce a coupling structure of an improved design allowing for the supplemental use of an O ring for certain types of fluids and where the metallic sealing surfaces are known to be unsuited to a metal-to-metal seal.

Other objects and advantages of the invention will become apparent as the following description proceeds taken in connection with the accompanying drawings, in which:

Figure 1 is a view in partial section of a coupling embodying my invention.

Fig. 2 is a modified form of coupling in partial section showing the use of an external nut used to produce the sealing pressure.

Fig. 3 is still another modification, in partial section, of a coupling embodying my invention.

Fig. 4 is an enlarged fragmentary view of the thread relationships existing in Fig. 1 with such relationships illustrated in exaggerated form for ready understanding.

Fig. 5 is a fragmentary view showing the conical relationship existing in the coupling of Fig. 3 with the conical angles exaggerated similarly to Fig. 4.

While the invention is suceptible of various modifications and alternative constructions, I have shown in detail and will herein describe in detail certain preferred embodiments, but it is to be understood that I do not thereby intend to limit the invention to the specific forms disclosed but intend to cover all modifications and alternative construction falling within the spirit and scope of the invention as expressed in the appended claims.

In coupling the unthreaded end of two pipes or conduits together or in coupling the unthreaded end of a single pipe to some other structure such as a header, manifold, valve or the like, a fluid coupling (or "coupler") is frequently called upon to perform reliably under extremely difficult conditions. The hydraulic system of an aircraft is a common application in which a number of difficult operating conditions are encountered. Such conditions include the existence of the fluid pressures of many thousands of pounds per square inch, the presence of severe vibration especially where coupling is to be made to an engine or the like, and the necessity for using tubes fashioned of materials that cannot be cold worked or machined. In addition it is necessary that the coupling be easily and quickly assembled and disassembled to effect a rapid replacement or repair. Such conditions must be met by a coupling of very small size and weight which is nevertheless capable of developing the large unit pressures required for effective sealing.

That the difficulties presented by such conditions of operation are not readily overcome is evidenced by the large amount of activity in this field in recent years and the large number of prior art patents in which attempts have been made to solve the problem. A large proportion of the prior art structures have utilized local deformation of the tube to produce a holding effect, or have included sharp points or edges for "biting into" the outer surface of the tube. My improved structure which is contrasted with such prior art structures both in structure and result is shown in exemplary form in Fig. 1.

Referring more particularly to Fig. 1 the coupling is indicated generally by the numeral 10 and shown in sealing engagement with a pipe or conduit 12. In this embodiment the coupling has a generally cylindrical extension 13 which projects outwardly beyond a hexagonal body portion 14. An additional threaded portion 15 is provided at the opposite end for securing to another tube, coupling, pressure vessel, or the like. The cylindrical extension 13 has a flared or conical orifice 16 which carries an internal thread 17. The conical orifice serves to receive a rotatable conical sleeve 20 having a cylindrical bore 21 for receiving the conduit 12 therein and an external thread on conical surface 23 for threaded engagement with the conical surface 16. A hexagonal end portion 25 serves to provide purchase for a wrench or other tightening device.

In the present embodiment the body of the coupling includes an annular recess 28 which may be occupied for supplementary sealing purposes by a toroidal O ring 30 of a resilient material, for example, synthetic rubber.

In order to more fully understand the relationships existing between the conical surface 16 of the body of the coupling and the conical surface 23 of the rotatable sleeve 20, reference may be made to Fig. 4. In this figure the angle A represents one half of the included angle of the conical surface 23 of the rotatable sleeve. Similarly, the angle B represents one half of the included angle of the conical surface 16 formed within the body of the coupling. The relationship between angle A and angle B has been exaggerated in the fragmentary view of Fig. 4 to bring out the fact that, in accordance with my invention, the included angle of the inner conical surface 23 exceeds the included angle of the outer conical surface 16. With the conical surfaces related as shown, it will be obvious from the drawing that all of the threads do not come into full engagement simultaneously as would be the case if the angles B and A were of equal magnitude. On the contrary, the first thread 31 of the threaded surface 16 is the first thread to come into full engagement with the threaded surface 23 of the rotatable member 20. In like manner it will be seen that the next thread 32 will subsequently come into engagement and so on for the entire series of threads on the threaded surface 16.

As the threads are more firmly engaged the pressure inwardly directed upon the rotatable sleeve 20 will be increased, thereby causing such sleeve to be inwardly deformed and slightly decreasing the diameter of the bore 21. When the rotatable sleeve 20 is turned completely home as shown in Fig. 1, the reduction in bore diameter resulting from such pressure causes the tube 12 to be firmly gripped at all points of contact.

As stated in connection with Fig. 4, the difference in taper of the conical threaded surfaces causes the thread 31, 32 and those adjacent thereto to engage the rotatable sleeve 20 before the remaining threads of the series. As a result the inwardly directed pressure exerted by threads 31 and 32 will, for all degrees of engagement, be greater than the inwardly directed force exerted by the threads at the other end of the threaded portion. It might normally be expected that under such circumsances the pressure exerted upon the tube at portion 34 directly under the initial threads 31, 32 would be greater than the pressure existing at any other point within the rotatable sleeve 20. Actually, however, precise studies and laboratory tests of the coupling demonstrate that this is not the case. While it is true that the inward pressure exerted the region of threads 31, 32 is maximum, it is to be noted that the radial thickness of metal in the rotatable sleeve 20 against which such force is applied to produce deformation is also a maximum in this region.

The effect of the differential taper disclosed, therefore, is to produce a maximum inward pressure at the point on the sleeve 20 of maximum radial thickness and a lesser inward pressure at a point of lesser thickness. This results in an equalizing of the inward force on the tube throughout the area of contact and the virtual elimination of localized stress.

The effect of decreasing or increasing the differential taper will, in view of the above discussion, be ascertainable by one skilled in the art. If, for example, angle A were made equal to angle B, maximum unit pressure would exist at a portion of the sleeve of minimum radial thickness, for example the portion 35. Conversely, if angle A exceeded angle B by too great an amount, a greater inward stress would exist at the thick portion 34 of the sleeve 20.

A further factor which must be considered in the selection of the proper differential angle is the modulus of elasticity and the wall thickness of the cylindrical extension 13. This extension acts, upon engagement of the threads, like a cantilever beam, the outermost edge of the extension 13 flaring outwardly in bell-like formation on the insertion of the rotatable sleeve 20. Thus the difference between angle A and angle B must be increased somewhat to make up for the latter effect.

In the design of the coupling of the kind just discussed, it is first necessary to choose a nominal cone angle which, using materials commonly employed in aircraft practice, may amount to approximately six degrees. Assuming a desired wall thickness for each of the tapered members and knowing the modulus of elasticity of the material used, the differential taper required to produce a constant deformation of the rotatable member from point to point along the axis may be readily calculated. As a practical matter, however, it has been found desirable to obtain the proper design by a process of trial and adjustment. It has been found that where too small a taper differential is used, the tube will be scored slightly in the region 35, whereas if too great a differential is applied the two will be scored or slightly deformed at the region 34. In a given practical case it has been found that a one half degree differential in taper causes pressure to be applied equally along the gripped portion of the conduit. The large area of contact provides both a strong mechanical connection resisting the pulling out of the conduit and also an effective seal for practically all types of fluid even where pressures of many thousands of pounds per square inch are employed.

It will be noted that the type of coupling embodying my invention lends itself to the use of a deformable O ring or resilient gasket which may be employed for supplemental sealing purposes. The use of such ring insures a positive seal even though tubing or conduit is used which has a roughened outer surface not satisfactory for a metal-to-metal seal with the sleeve 20. Under such circumstances pressure existing within the conduit also exists in the recess 36 to the left of the O ring 30 shown in Fig. 1. Such pressure will cause the O ring to move to the right of the position shown and into abutting relation to the presented end of the rotatable sleeve 20. The use of the O ring as shown, therefore. effectively prevents any escape of contained fluid, even under the most adverse conditions of the sealing surface.

The coupling described may be effectively employed both in the case of conduits fabricated of soft material and in the case where a hard conduit material is used. In the case of soft conduit material, the coupling enables the assembly time to be reduced to a minimum since neither a flare nor a bead is required. Because the inward stresses are distributed evenly along a considerable area of the tube, the amount of cold working of the tube is kept to a minimum, even where the modulus of elasticity of the tube or conduit is exceedingly low. In the case of tubes of hard material, use of a flare or bead is usually impossible or impracticable and the coupling disclosed is therefore particularly advantageous.

Since the surface of the bore 21 is perfectly smooth and free from sharp or "biting" edges, sharply localized stresses are avoided and failure under severe conditions of vibration from this cause is therefore reduced to an absolute minimum.

It will also be apparent that the use of the coupling disclosed enables the same end portion of conduit to be repeatedly coupled and uncoupled because of the factor that the surface of the conduit is not deformed or otherwise affected by the coupling process. The latter is of great practical importance since the rejoining of a coupling of a more conventional type requires a "fresh" end of conduit to be inserted. Where the additional length is not available, replacement of the entire conduit is often necessary.

Fig. 2 shows another embodiment of a coupling constructed in accordance with my invention. In this case the body of the coupling indicated at 40 is provided with a threaded conical extension 41, such extension having a bore 42 of sufficient diameter for the slidable admission of a tube or conduit 43. An external threaded surface 44 of the extension 41 mates with a similarly threaded surface 45 carried on the inside of a nut 46. If desired, the nut 46 may have a recess 47 for the insertion of an O ring 48. The O ring is retained in position by reason of a retaining portion 50 extending inwardly to a diameter approximately the same as that of the bore 42.

Just as in the embodiment of Fig. 1 the conical surfaces 44 and 45 have a differential taper which is effective to produce a maximum inwardly directed force in the region of maximum thickness of the inner sleeve. In the structure of Fig. 2 the surface 44 has a taper equal to the angle A shown in Fig. 4 while the surface 45 has a taper corresponding to the angle B in the latter figure. Threads 51 and 52 of the nut are, therefore, the first to engage and, when the nut is in the fully advanced position, apply the maximum inwardly directed pressure. Thus, in a manner completely analogous to that shown in Fig. 1, inwardly directed pressure is exerted on the conduit 43 which is substantially constant at all points along the axis thereof.

Still another embodiment of a coupling employing my invention is shown in Fig. 3, where the two functions, that is, the relative advancement of the members and the application of inward force upon a conical surface are separate. In this embodiment the body 60 of the coupling has a cylindrical extension consisting of a threaded portion 61 and a tapered portion 62, both of which have a bore 63 for slidable engagement with the outside of a conduit 64. A cooperating nut 65 is likewise provided with a threaded portion 66 and a conical portion 68 for mating with similar portions on the body of the coupling.

Unlike the embodiment of Figs. 1 and 2, the thread in this instance is not tapered, serving merely to draw the conical surfaces into engagement. The sealing function, however, is performed in a manner similar to Figs. 1 and 2 in that a differential taper is employed, such differential taper being shown in enlarged and exaggerated form in Fig. 5. It will be seen from this figure that as the conical portion 68 of the nut is brought into engagement with the conical portion 62 of the body of the coupling, contact takes place first at a region 70 on the nut. Thus as the nut is fully advanced into the position shown in Fig. 3, maximum inward pressure will be exerted by the nut at the portion 70 thereof, which corresponds to the section of maximum radial thickness of the conical extension 62. A value of differential taper can be readily chosen in accordance with my teachings to cause the unit pressure exerted inwardly upon the conduit 64 to be constant at all points along the sealing surface.

Upon examination of the embodiments illustrated it will be noted that the improved mechanical and sealing characteristics and the other advantages obtained in the use of couplings of the type shown have been obtained by the use of component parts which are inexpensive and simple to produce. Each of the coupler components is of a type readily produced in quantity on an automatic screw machine at a cost comparing favorably with couplings not possessing the features described.

I claim as my invention:

1. In a coupler for the pressuretight coupling of a purely cylindrical tube end, the combination comprising a sleeve having an inner bore for the close fitting admission of a tube and having an axially tapered outer surface, and means for compressing said sleeve circumferentially into radial contact with the portion of said tube wall lying thereunder, said sleeve compressing means surrounding said sleeve and constructed to grip the same for application of an inwardly directed stress to said sleeve which varies along the axis thereof and is approximately proportional to the radial thickness of the sleeve at the respective points of application of said stress tending to equalize the inward pressure exerted on said tube wall.

2. In a coupler for the pressuretight coupling of a purely cylindrical tube end, the combination of a first sleeve having a cylindrical bore for the close fitting slidable admission of said tube and having a conical outer surface, a second sleeve having a conical inner surface telescoped over said first sleeve and mating face-to-face therewith, means for producing relative axial advancement of said conical surfaces into wedging engagement to squeeze said first sleeve inwardly against said tube, the included angle of the conical surface on said first sleeve being greater than the included angle of the conical surface on said second sleeve by approximately one angular degree whereby said second sleeve applies a greater inwardly directed unit stress to the thick portion of said first sleeve than to the thin portion thereof for the equalization of sealing pressure axially along said tube.

3. In a coupler for the pressuretight coupling of a purely cylindrical tube end, said coupling including an inner sleeve having a cylindrical bore for the close fitting slidable admission of said tube and having a conical outer surface having a thread thereon, an outer sleeve having a conical threaded inner surface telescoped over the outer surface of said inner sleeve and mating therewith, the included angle of the conical surface on said inner sleeve being greater than the included angle of the conical surface of said outer sleeve to the end that the radially inward sealing pressure exerted bodily upon said tube by said inner sleeve upon engagement of said thread is substantially constant at all positions along the axis thereof.

4. In a coupler for the pressuretight coupling of a purely cylindrical tube end, the combination of an inner sleeve having a cylindrical bore of a diameter to engage said tube in snug sliding relation and having a threaded conical outer surface, an outer sleeve having a conical threaded inner surface for mating with the threaded surface of said inner sleeve, said outer sleeve having an annular recess adjacent the threads of minimum diameter, the diameter of said recess being appreciably greater than the outer diameter of said tube, a deformable O ring in said recess and in resilient sealing engagement with said tube and said outer sleeve, and means for retaining said ring against axial movement upon application of pressure within said tube.

5. In a coupler for the pressuretight coupling of a purely cylindrical tube end, the combination comprising an inner sleeve having a cylindrical bore adapted to engage the outside of said tube in sliding relation and having a conical threaded outer surface, a body member having an internally threaded conically flared opening for receiving said sleeve in threaded engagement, the included angle of the conical surface of said sleeve being sufficiently greater than the included angle of the conical surface of said body member so that the inward deformation of said sleeve is substantially the same at all points along the axis thereof.

6. In a coupler for the pressuretight coupling of a purely cylindrical tube end, the combination of a body member having an axial extension thereon, said extension including a bore for the slidable insertion of said tube, said extension having an externally threaded cylindrical portion and a smooth external conical portion arranged side by side, and a nut having an internally threaded cylindrical portion and a smooth internal conical portion for face-to-face mating with corresponding portions on said extension, the included angle of the external conical portion being greater than the included angle of the internal conical portion to an extent that the wedging engagement resulting from the engagement of said threads produces substantially the same inwardly directed sealing pressure on said tube at all points along the axis of said extension.

VERNE P. DONNER.

REFERENCES CITED

The following references are of record in the file of this patent:

UNITED STATES PATENTS

| Number | Name | Date |
|---|---|---|
| 796,580 | Johnston | Aug. 8, 1905 |
| 1,257,852 | Hall | Feb. 26, 1918 |
| 2,212,183 | Parker | Aug. 20, 1940 |
| 2,246,557 | Walters | June 24, 1941 |

FOREIGN PATENTS

| Number | Country | Date |
|---|---|---|
| 286,969 | Great Britain | Mar. 15, 1928 |